No. 778,983. PATENTED JAN. 3, 1905.
R. B. LUMPKIN.
PNEUMATIC COTTON HANDLING APPARATUS.
APPLICATION FILED JUNE 3, 1904.
2 SHEETS—SHEET 2.
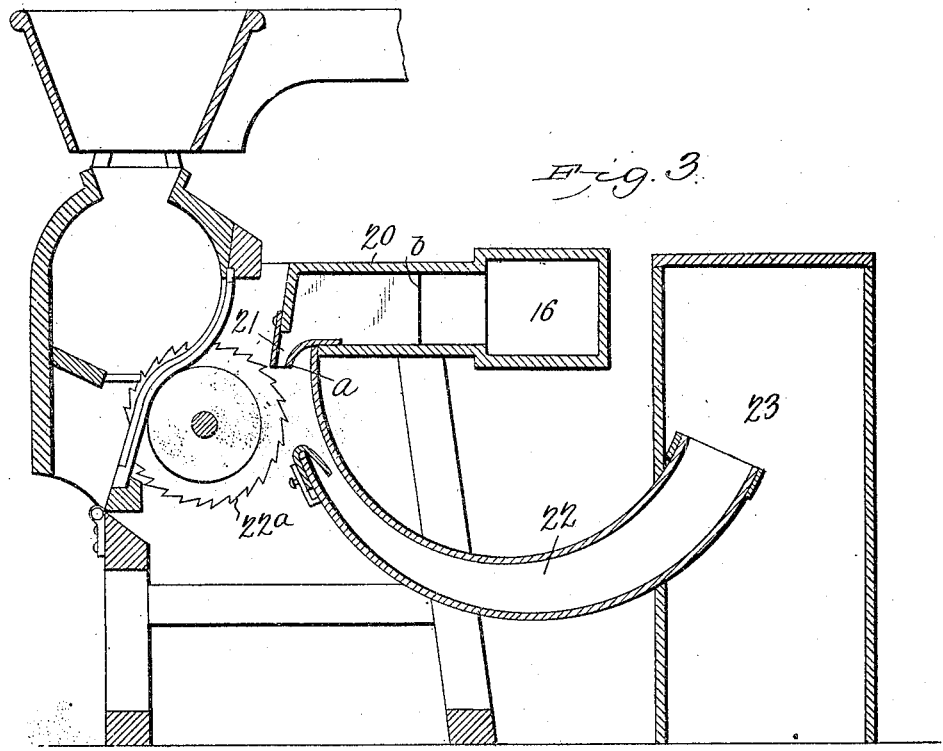
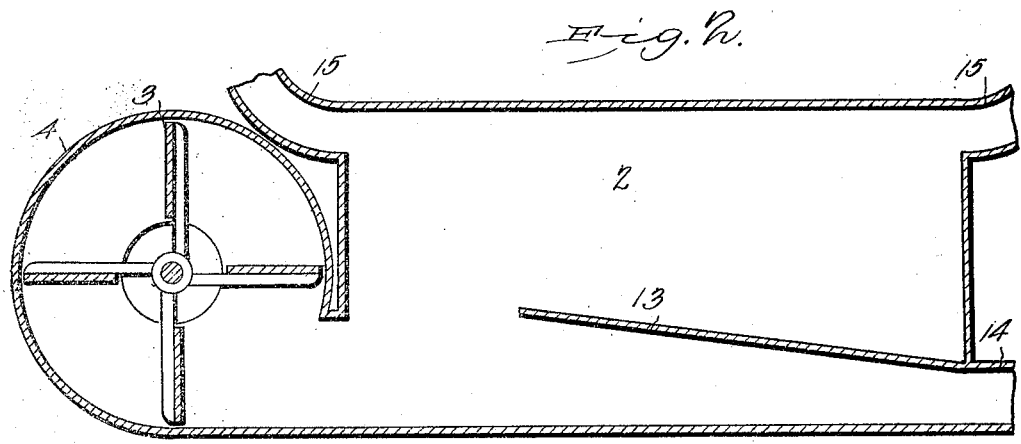

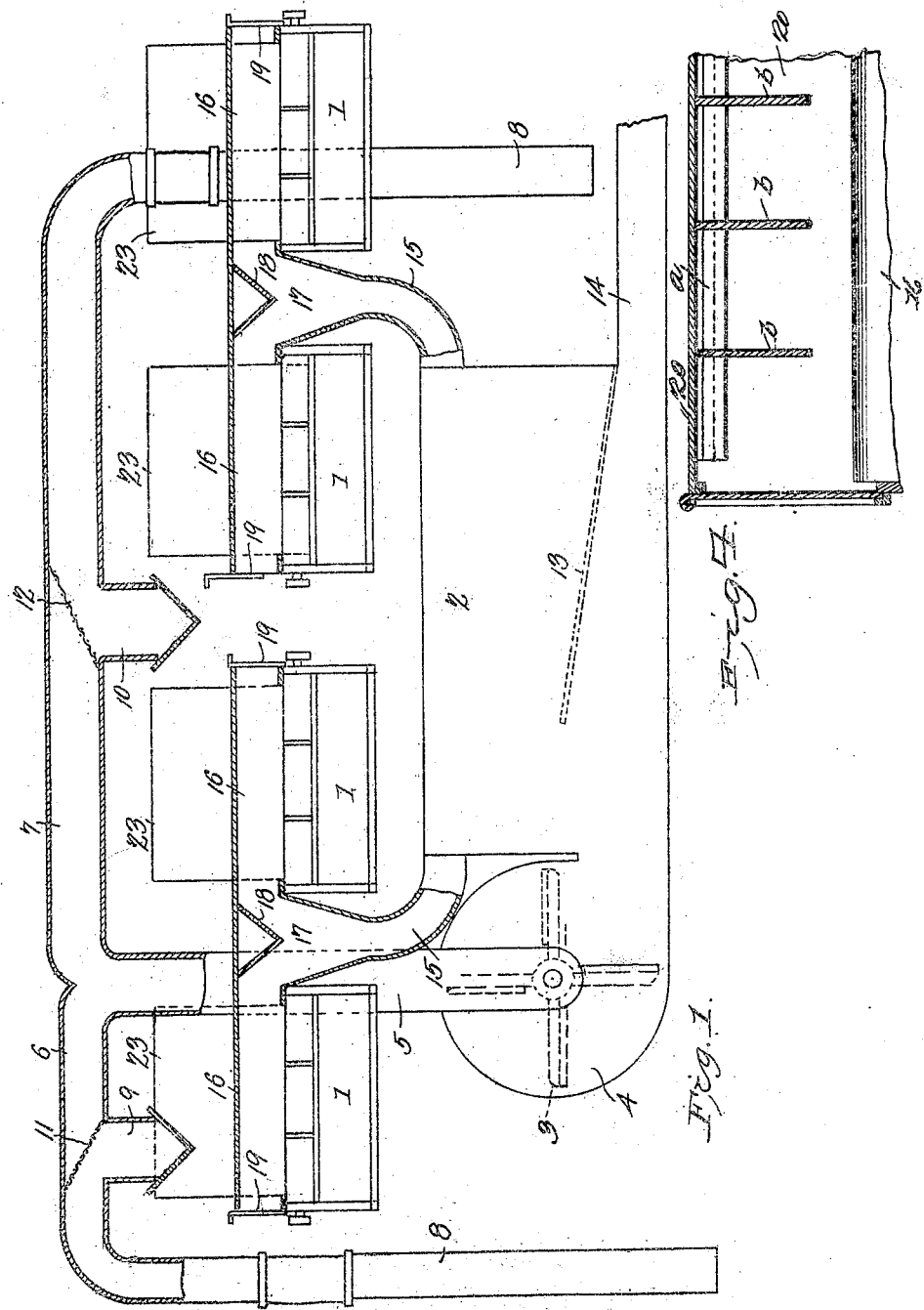

No. 778,983. Patented January 3, 1905.

UNITED STATES PATENT OFFICE.

ROBERT B. LUMPKIN, OF MART, TEXAS.

PNEUMATIC COTTON-HANDLING APPARATUS.

SPECIFICATION forming part of Letters Patent No. 778,983, dated January 3, 1905.

Application filed June 3, 1904. Serial No. 211,057.

*To all whom it may concern:*

Be it known that I, ROBERT B. LUMPKIN, a citizen of the United States, residing at Mart, in the county of McLennan and State of Texas, have invented a new and useful Pneumatic Cotton-Handling Apparatus, of which the following is a specification.

This invention relates to pneumatic cotton-handling apparatus; and it has for its object to provide a device of this class by means of which a considerable saving may be effected in the labor of handling cotton.

To this end my invention comprises apparatus for unloading cotton simultaneously from two wagons and for conveying the cotton from one wagon to a storage place and from the other wagon to feeding devices for supplying a battery of gins.

My invention further comprises means for blowing the lint from the saws to the condensers and for blowing the seed to the seed-house, to a car, or to some other place of deposit.

The invention further comprises means for conveying into the seed-duct any dirt or trash that may be separated from the cotton during the passage of the latter from the wagons to the storehouse and to the gins, respectively, the several devices which constitute my invention to be constructed and assembled to be operated by means of a single fan, substantially in the manner which will be hereinafter fully described, and particularly pointed out in the claims.

In the accompanying drawings, Figure 1 is a diagrammatic view illustrative of my invention. Fig. 2 is a sectional view of the compressing-chamber, showing the inlet of the seed-ducts. Fig. 3 is a sectional detail view taken through one of the gin-stands. Fig. 4 is a sectional detail view taken on the line 4 4 in Fig. 3.

Corresponding parts in the several figures are indicated by similar characters of reference.

In Fig. 1 of the accompanying drawings I have diagrammatically illustrated a battery of four gin-stands, each of said gins being designated 1.

2 designates a compressing-chamber which receives the blast discharged from a fan 3, mounted in a casing 4, the discharge-opening of which is suitably connected with the lower part of said compressing-chamber. A suction-tube 5, connected with the intake of the fan-case, extends upwardly and diverges into two branches 6 and 7, each of which terminates in a flexible suction-pipe 8 of ordinary construction, which may be manipulated for the unloading of wagons. The branch 6 of the suction-pipe is provided with a trap 9, which communicates with a storage place in which the cotton may be temporarily stored during the busy season, and the branch 7 of the suction-pipe has a similar trap 10, which is suitably connected with feeders, (not shown,) whereby the cotton is supplied to the gins. Screens 11 and 12 are disposed in the suction-pipes 6 and 7 between the traps 9 and 10 and the main suction-pipe 5. These screens serve, primarily, as deflectors by means of which the cotton is deflected into the traps; secondarily, they serve as sieves through which dirt and loose trash may be separated from the cotton and permitted to pass through the branches 6 and 7 into the main suction-tube 5 and from thence through the fan-case into the compressing-chamber 2, within which a deflector 13 is disposed to guide such trash into the seed-duct 14, into which the seeds are conveyed from the gins through suitable conductors or by suitable means. (Not shown.) The ends of the compressing-chamber are connected with air-ducts 15, one at each end, and each directed between a pair of gin-stands. Above each pair of gin-stands is disposed an air-chamber 16, having an opening 17, which is connected with the enlarged discharge end of one of the air-ducts 15. Within each air-chamber 16 is furthermore placed a pair of inclined boards 18, combining with the top of said air-chamber to form a triangular deflector which divides the discharge from the enlarged opening 17 of the duct 15, so as to divert such discharge equally into both ends of the air-chamber, from which it will thus be equally supplied to the gins. The ends of the air-chamber are provided with valves 19, which may be opened at any time when it shall be desired to blow out the air-chambers.

The air-chambers 16 are extended over the gins in a manner practically corresponding with that shown in Letters Patent No. 700,347, granted to myself on the 20th day of May, 1902, by reference to which it will be seen that said extensions, which are here designated 20, are provided with discharge-spouts 21, serving to direct the discharge of air against the saws 22ª to remove the lint from said saws. Discharge-chutes 22 serve to convey the lint from the gins to the condensers 23, as shown in my Letters Patent above referred to. The discharge spouts or nozzles 21, as in my Letters Patent above referred to, have discharge-mouths consisting of elongated slots, the front walls of the nozzles being slightly curved to the rear. The lips a of these discharge-nozzles are also connected by braces b at appropriate distances apart; but these braces in my present invention are extended back in the direction of the main air-chamber 16, thus answering a double purpose in holding the lips together and breaking the current of air and directing the same in the direction of the outlet, thereby overcoming one of the most difficult features in air-blast gins.

The operation and advantages of this invension will be readily understood from the foregoing description, taken in connection with the accompanying drawings, by those skilled in the art to which it appertains. The fan is obviously to be made of sufficient capacity to accomplish the several purposes of the invention; but it is equally obvious that by using a single fan in the manner herein described much of the initial expense in setting up the plant may be saved, the saving being not only in the substitution of a single fan for a plurality of fans, but also largely in the saving of power, machinery, belting, and the like. When the fan is started in operation, suction is established in the suction-tube 5 and in the branches 6 and 7 of the latter, thus enabling cotton to be unloaded simultaneously from two wagons and fed, respectively, to a storehouse and to the gin-stands. The air entering the suction-tubes with the cotton will pass through the screens 11 and 12 together with dirt and trash separated from the cotton, which will pass through the suction-pipe 5 and through the fan-casing into the compressing-chamber under the inclined board or deflector 13, under which dirt and trash pass along with a blast of air which carries such dirt and trash through the seed-duct along with the seed and to the place of deposit of the latter. A large proportion of the air coming from the fan-case is diverted into the upper portion of the compressing-chamber, the air thus diverted having been freed from dirt and trash, as before described. It will thus be pure air that finds its way through the ducts 15 and the flaring mouths 17 of said ducts into the air-chambers 16, from whence the air passes into the gins where it serves to detach the lint from the saws, as shown in my Letters Patent hereinbefore referred to, the taple passing through the chute 22 to the condensers 23.

Having thus described my invention, I claim—

1. In a device for handling cotton, the combination of a fan, a compressing-chamber receiving the discharge from said fan, a suction-pipe connected with the intake of said fan, a gin, and means for conveying a current of air from the compressing-chamber to said gin.

2. In a device for handling cotton, the combination of a fan, a compressing-chamber receiving the discharge from said fan, a seed-duct having an inclined top board forming a deflector extending into said compressing-chamber, a suction-pipe connected with the intake of the fan-case, a gin, and means for conveying a current of air from the compressing-chamber to said gin.

3. In a device for handling cotton, the combination of a fan, a compressing-chamber connected with the discharge from the casing of said fan, a gin, means for conveying a current of air from the compressing-chamber to said gin, a suction-pipe connected with the intake of the fan-case, and branches diverging from the suction-pipe and terminating in flexible suction-tubes.

4. In a device for handling cotton, the combination of a fan, a compressing-chamber connected with the discharge of the fan-case, a suction-pipe connected with the intake of the fan-case, branches diverging from said suction-pipe and terminating in flexible suction-tubes, and traps depending from said branches.

5. In a device for handling cotton, the combination of a fan, a compressing-chamber connected with the discharge of the fan-case, a suction-pipe connected with the intake of the fan-case, branches diverging from said suction-pipe, and terminating in flexible suction-tubes, traps depending from said branches, and screens disposed in said branches between the traps and the main suction-pipe.

6. In a device for handling cotton, the combination of a fan, a compressing-chamber connected with the discharge from the fan-case, a suction-pipe connected with the intake of the fan-case, branches diverging from said suction-pipe, traps depending from said branches, and screens disposed in said branches diagonally above said traps, the lower ends of said screens being connected at the edges of the traps nearest adjacent to the main suction-pipe.

7. In a device for handling cotton, a fan, a compressing-chamber connected with the discharge from the fan-case, a suction-pipe connected with the intake of the fan-case, a plurality of gin-stands, air-chambers disposed above each pair of gin-stands and having suitable discharge-openings and air-ducts connecting said air-chambers with the compressing-chamber.

8. In a device for handling cotton, the combination of a fan, a compressing-chamber connected with the discharge of the fan-case, a suction-pipe connected with the intake of the fan-case, a plurality of gin-stands, an air-chamber disposed above each pair of gin-stands and having suitable outlets, air-ducts connecting said air-chambers with the condensing-chamber and having enlarged mouths opening into the air-chambers, and deflectors disposed within the air-chambers above said enlarged flaring mouths to divert the air coming through the ducts into the ends of the air-chambers connected with the gin-stands.

9. In a device for handling cotton, the combination of a fan, a compressing-chamber connected with the discharge of the fan-case, a suction-chamber connected with the intake of the fan-case, a plurality of gin-stands, air-chambers disposed above each pair of gin-stands and provided with suitable discharge-openings, air-ducts connecting said air-chambers with the compressing-chamber, and a deflector within the latter connected with a seed-spout and directing into the latter, dirt and trash coming from the pan.

10. In a device for handling cotton, the combination of a fan, a compressing-chamber connected with the discharge of the fan-case, a suction-pipe connected with the intake of the fan-case, a plurality of gin-stands, air-chambers disposed above each pair of gin-stands, air-ducts connecting said air-chambers with the compressing-chamber, and valves at the outer ends of the air-chambers.

In testimony that I claim the foregoing as my own I have hereto affixed my signature in the presence of two witnesses.

ROBT. B. LUMPKIN.

Witnesses:
 CHAS. A. ELLIOTT,
 LEW HAYS.